United States Patent
Hart

(10) Patent No.: US 8,533,123 B2
(45) Date of Patent: Sep. 10, 2013

(54) SYSTEMS AND METHODS FOR CONDUCTING CONTACTLESS PAYMENTS USING A MOBILE DEVICE AND A MAGSTRIPE PAYMENT CARD

(75) Inventor: Annmarie D. Hart, Seal Beach, CA (US)

(73) Assignee: Magtek, Inc., Seal Beach, CA (US)

( * ) Notice: Subject to any disclaimer, the term of this patent is extended or adjusted under 35 U.S.C. 154(b) by 58 days.

(21) Appl. No.: 13/324,982

(22) Filed: Dec. 13, 2011

(65) Prior Publication Data

US 2012/0150687 A1 Jun. 14, 2012

Related U.S. Application Data

(60) Provisional application No. 61/422,633, filed on Dec. 13, 2010.

(51) Int. Cl.
*G06Q 20/00* (2012.01)
*G06Q 20/38* (2012.01)

(52) U.S. Cl.
CPC .................. *G06Q 20/3821* (2013.01)
USPC .............................. 705/76; 705/64

(58) Field of Classification Search
USPC ................................... 705/64, 76
See application file for complete search history.

(56) References Cited

U.S. PATENT DOCUMENTS

| | | | |
|---|---|---|---|
| 5,235,166 A | 8/1993 | Fernadez | |
| 5,430,279 A | 7/1995 | Fernadez | |
| 5,491,752 A | 2/1996 | Kaufman et al. | |
| 5,524,072 A | 6/1996 | Labaton et al. | |
| 5,616,904 A | 4/1997 | Fernadez | |
| 5,644,636 A | 7/1997 | Fernandez | |
| 6,760,841 B1 | 7/2004 | Fernandez | |
| 6,830,182 B2 | 12/2004 | Izuyama | |
| 7,210,627 B2 | 5/2007 | Morley, Jr. et al. | |
| 7,318,048 B1 * | 1/2008 | King | 705/39 |
| 7,415,443 B2 * | 8/2008 | Hobson et al. | 705/65 |
| 7,641,111 B2 | 1/2010 | Adams et al. | |
| 7,703,676 B2 | 4/2010 | Hart et al. | |

(Continued)

FOREIGN PATENT DOCUMENTS

KR 10-2005-0097624 A 10/2005
WO WO2008/127127 A1 * 10/2008

OTHER PUBLICATIONS

Liou et al. ("On Improving Feasibility and Security Measures of Online Authentication", International Journal of Advancements in Computing Technology, vol. 2, No. 4, Oct. 2010, 11 pages).*

(Continued)

*Primary Examiner* — James D Nigh
(74) *Attorney, Agent, or Firm* — Gabriel Fitch; Loza & Loza, LLP

(57) ABSTRACT

Systems and methods for conducting contactless payments using a mobile device and a magstripe payment card are provided. One such method includes receiving, at the mobile device and prior to a requested financial transaction, a dynamic authentication token from a server, the dynamic authentication token indicative of a predetermined authentication of a magstripe payment card based on data obtained during a swipe of the magstripe payment card; wirelessly transmitting, in response to a request to facilitate a financial transaction, the dynamic authentication token from the mobile device to a contactless payment terminal; and sending the dynamic authentication token and information related to the requested financial transaction to the server for authorization of the requested financial transaction.

26 Claims, 5 Drawing Sheets

(56) References Cited

U.S. PATENT DOCUMENTS

| | | | |
|---|---|---|---|
| 7,726,566 B2 | 6/2010 | Brown et al. | |
| 7,997,476 B2 * | 8/2011 | Gannon | 235/379 |
| 8,231,055 B2 * | 7/2012 | Wen | 235/449 |
| 8,286,875 B2 * | 10/2012 | Tang et al. | 235/449 |
| 8,412,640 B2 * | 4/2013 | Dixon et al. | 705/76 |
| 2003/0192948 A1 | 10/2003 | Izuyama | |
| 2004/0182921 A1 | 9/2004 | Dickson et al. | |
| 2005/0006471 A1 | 1/2005 | Bedell, Jr. et al. | |
| 2005/0165695 A1 | 7/2005 | Berardi et al. | |
| 2005/0167496 A1 | 8/2005 | Morley, Jr. et al. | |
| 2006/0016878 A1 | 1/2006 | Singer et al. | |
| 2006/0049255 A1 | 3/2006 | von Mueller et al. | |
| 2006/0206709 A1 | 9/2006 | Labrou et al. | |
| 2009/0307132 A1 | 12/2009 | Phillips | |
| 2010/0138347 A1 | 6/2010 | Chen | |
| 2010/0306113 A1 * | 12/2010 | Gray et al. | 705/76 |
| 2011/0131104 A1 * | 6/2011 | Rose et al. | 705/17 |
| 2011/0140841 A1 * | 6/2011 | Bona et al. | 340/5.83 |
| 2011/0240745 A1 * | 10/2011 | Brown | 235/492 |

OTHER PUBLICATIONS

International Search Report for Application No. PCT/US2011/064733 filed Dec. 13, 2011, dated May 31, 2012, mailed Jun. 1, 2012, 3 pages.

Written Opinion for Application No. PCT/US2011/064733 filed Dec. 13, 2011, dated May 31, 2012, mailed Jun. 1, 2012, 3 pages.

* cited by examiner

SYSTEMS AND METHODS FOR CONDUCTING CONTACTLESS PAYMENTS USING A MOBILE DEVICE AND A MAGSTRIPE PAYMENT CARD

CROSS-REFERENCE TO RELATED APPLICATION(S)

The present application claims priority to and the benefit of Provisional Application No. 61/422,633, filed Dec. 13, 2010, entitled "SYSTEMS AND METHODS FOR CONDUCTING CONTACTLESS PAYMENTS USING A MOBILE DEVICE AND A MAGSTRIPE PAYMENT CARD", the entire content of which is incorporated herein by reference.

FIELD

The present invention relates generally to contactless payment card systems, and more specifically to systems and methods for conducting contactless payments using a mobile device and a magstripe payment card.

BACKGROUND

Conventional contactless payment systems have gained some acceptance by retailers and are becoming increasingly popular among consumers. In contactless payment systems, consumers can use a payment card or other mobile device (e.g., a cell phone) that securely communicates consumer account information via a radio frequency communication link to a merchant's payment terminal. The payment terminal then communicates with an appropriate financial network or other back-end processing system to authorize the transaction. Once authorized, the consumer and/or merchant completes the transaction.

Next generation cell phones and other mobile devices are being equipped with near field communication (NFC) technology to allow them to interface with contactless payment cards, contactless payment terminals, and other NFC equipped cell phones. However, significant security issues exist today for use of these mobile devices with the contactless payment terminals and payment cards.

SUMMARY

Aspects of the invention relate to systems and methods for conducting contactless payments using a mobile device and a magstripe payment card by storing one or more pre-authenticated swipes of the magstripe card on a mobile device for use in subsequent NFC transactions. In one embodiment, the invention relates to a method for conducting contactless payments using a mobile device, the method comprising receiving, at the mobile device and prior to a requested financial transaction, a dynamic authentication token from a server, the dynamic authentication token indicative of a predetermined authentication of a magstripe payment card based on data obtained during a swipe of the magstripe payment card; wirelessly transmitting, in response to a request to facilitate a financial transaction, the dynamic authentication token from the mobile device to a contactless payment terminal; and sending the dynamic authentication token and information related to the requested financial transaction to the server for authorization of the requested financial transaction.

In one embodiment, the wirelessly transmitting the dynamic authentication token comprises use of a communication protocol selected from the group of protocols consisting of CDMA, GSM, Bluetooth, WiFi, and combinations thereof. In one embodiment, the mobile device comprises a device selected from the group consisting of a cell phone, a smartphone, a tablet PC, PDA, portable media player, and combinations thereof. In one embodiment, the dynamic authentication token does not comprise an account number associated with the magstripe payment card.

In one embodiment, the dynamic authentication token is configured to be transferred from the mobile device to a computing device of another user using a communication protocol selected from the group consisting of near field communication, WiFi, email, text message, and combinations thereof. In one embodiment, the magstripe payment card comprises a magnetic medium comprising recorded data and a magnetic fingerprint comprising an intrinsic magnetic characteristic of the magnetic medium. In one embodiment, the intrinsic magnetic characteristic of the magnetic medium comprises a remnant noise characteristic. In one embodiment, the method further includes generating the dynamic authentication token using a dynamic data of the magnetic fingerprint. In one embodiment, the magnetic fingerprint is stochastic.

In one embodiment, the dynamic authentication token is configured to be used only once. In one embodiment, the method further includes reading information from a magnetic medium of the magstripe payment card, the magstripe information comprising recorded data comprising an account number and a magnetic fingerprint comprising an intrinsic magnetic characteristic of the magnetic medium.

In one embodiment, the receiving, at the mobile device and prior to the requested financial transaction, the dynamic authentication token from the server comprises securely uploading the magstripe information to the server; determining, at the server, an authenticity of the magstripe card based on a comparison of the read magnetic fingerprint and a stored magnetic fingerprint indexed by the account number; and if the magstripe card is authenticated based on the comparison generating, at the server, the dynamic authentication token comprising dynamic data using the magnetic fingerprint; and securely downloading the dynamic authentication token to the mobile device.

In some embodiments, the sending, at the contactless payment terminal, the dynamic authentication token and the information related to the requested financial transaction to the server for authorization of the requested financial transaction comprises sending, from the server, the recorded data and the requested financial transaction information to a payment processor for authorization of the requested financial transaction; and receiving, at the contactless payment terminal, information indicative of whether the requested transaction was authorized.

In another embodiment, the invention relates to a system for conducting contactless payments using a mobile device, the system comprising a server; a mobile device configured to store a dynamic authentication token indicative of a predetermined authentication of a magstripe payment card based on data obtained during a swipe of the magstripe payment card, wherein the mobile device is configured to transmit the dynamic authentication token if a financial transaction is requested; and a contactless payment terminal configured to receive the dynamic authentication token; and send the dynamic authentication token and information related to the requested financial transaction to the server for authorization of the requested financial transaction.

In one embodiment, the mobile device is configured to transmit the dynamic authentication token using a communication protocol selected from the group of protocols consisting of CDMA, GSM, Bluetooth, WiFi, and combinations thereof. In one embodiment, the mobile device comprises a device selected from the group consisting of a cell phone, a smartphone, a tablet PC, PDA, portable media player, and combinations thereof. In one embodiment, the dynamic authentication token does not comprise an account number associated with the magstripe payment card.

In one embodiment, the dynamic authentication token is configured to be transferred from the mobile device to a computing device of another user using a communication protocol selected from the group consisting of near field communication, WiFi, email, text message, and combinations thereof. In one embodiment, the magstripe payment card comprises a magnetic medium comprising recorded data and a magnetic fingerprint comprising an intrinsic magnetic characteristic of the magnetic medium. In one embodiment, the intrinsic magnetic characteristic of the magnetic medium comprises a remnant noise characteristic. In one embodiment, the server is configured to generate the dynamic authentication token using a dynamic data of the magnetic fingerprint. In one embodiment, the magnetic fingerprint is stochastic. In one embodiment, the dynamic authentication token is configured to be used only once.

In one embodiment, the system further comprises a card reader configured to read information from a magnetic medium of the magstripe payment card, the magstripe information comprising recorded data comprising an account number and a magnetic fingerprint comprising an intrinsic magnetic characteristic of the magnetic medium. In one such case, a computer coupled to the card reader is configured to securely upload the magstripe information to the server; wherein the server is configured to determine an authenticity of the magstripe card based on a comparison of the read magnetic fingerprint and a stored magnetic fingerprint indexed by the account number; and wherein, if the magstripe card is authenticated based on the comparison, the server is configured to generate the dynamic authentication token comprising dynamic data using the magnetic fingerprint, and securely download the dynamic authentication token to the mobile device.

In one embodiment, the system further includes a payment processor; wherein the server is configured to send the recorded data and the requested financial transaction information to the payment processor for authorization of the requested financial transaction; and wherein the contactless payment terminal is configured to receive information indicative of whether the requested transaction was authorized from the payment processor.

DETAILED DESCRIPTION

Figure 1:
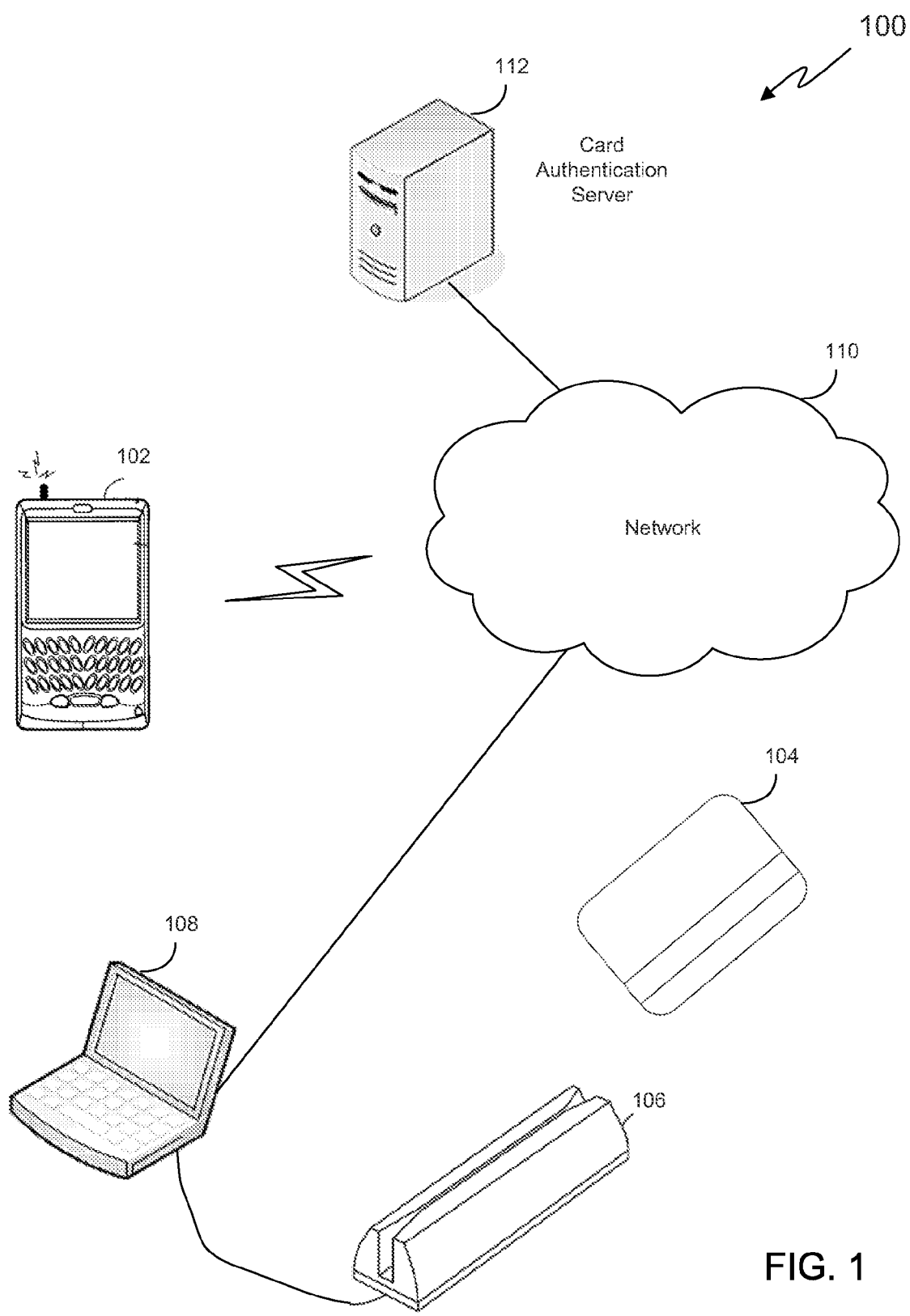
FIG. 1 is a schematic block diagram of a system for loading dynamic authentication tokens on to a cell phone, where the dynamic authentication tokens are indicative of pre- authenticated swipes of a magstripe payment card to be used for subsequent near field communication (NFC) transactions in accordance with one embodiment of the present invention.

Referring now to the drawings, embodiments of systems and methods for conducting contactless payments using a mobile device and a magstripe payment card are illustrated. In several embodiments, one or more pre-authenticated swipes of the magstripe card are stored on a trusted authentication server or the mobile device for use in subsequent NFC transactions. The one or more pre-authenticated swipes are generated by the trusted authentication server and can be downloaded to the mobile device as dynamic authentication tokens indicative of a confirmed validity of the magstripe card. While the dynamic authentication tokens may take the form of a conventional 16 digit payment account number (PAN), they do not generally contain the actual account number associated stored on the magstripe card. In several embodiments, dynamic authentication tokens contain dynamic data and are intended for one time use. The dynamic authentication tokens also include information that can indicate to a merchant that the trusted authentication server is to be contacted for authorization of any transaction associated with use of the token.

When a card holder wants to perform a financial transaction using his mobile device, he can position his mobile device storing the one or more dynamic authentication tokens near a contactless payment terminal for payment of the requested financial transaction. The cell phone can communicate the token to the contactless payment terminal which sends the token to the authentication server for authorization. The authentication server sends the payment account number and any other appropriate data from the magstripe card, previously read from the magstripe card and communicated to the server before issuance of the token, along with details of the requested financial transaction to a payment processor for authorization. If the transaction is authorized, the authentication server notifies the payment terminal and may provide an authorization code.

FIG. 1 is a schematic block diagram of a system 100 for loading dynamic authentication tokens on to a cell phone 102, where the dynamic authentication tokens are indicative of pre-authenticated swipes of a magstripe payment card 104 to be used for subsequent near field communication (NFC) transactions in accordance with one embodiment of the present invention. The system 100 includes a card reader 106 coupled to a laptop 108 coupled by a network 110 to a trusted card authentication server 112. The cell phone 102 is wirelessly coupled to the network 110. For example, the cell phone 102 may communicate, directly or indirectly via intermediate communication devices such as cellular telephone switching networks, with the server 112 or laptop 108 using WiFi, cellular phone communication protocols such as CDMA, GSM, Bluetooth, or other communication capabilities commonly provided for mobile devices.

In operation, a magstripe card holder may communicate a request to the server 112 that pre-authenticated swipes of the magstripe payment card 104 be stored on the server 112 and optionally downloaded to the cell phone 102. In several embodiments, this request is communicated using laptop 108 via an application or website linked to the server 112. If the request is granted, the card holder swipes the magstripe card 104 one or more times through the card reader 106. In such case, the laptop 108 receives and securely sends the information read from the magstripe card 104 to the server 112. The secure transmission to the server can be accomplished using any number of encryption techniques that are known in the art for securely transferring sensitive financial information.

The magstripe card can be a financial payment card such as a credit card, debit card, gift card or other card suitable for making financial payments. As such, the information read from the magstripe card includes a payment account number (PAN), other information commonly stored on track 1 or track 2 of a magstripe payment card, and a magnetic fingerprint indicative of an intrinsic magnetic characteristic of the magnetic medium of the magstripe card. Techniques for extracting and comparing magnetic fingerprints are described in U.S. Pat. Nos. 6,098,881, 7,478,751, 7,210,627, 7,377,433, 7,703,676, and 7,673,799, the entire content of each document is hereby incorporated by reference.

The server 112 can determine whether the magnetic fingerprint for each swipe represents a valid magnetic fingerprint for the magstripe card by comparing each swiped magnetic fingerprint with a stored magnetic fingerprint extracted during issuance of the magstripe card and indexed by the assigned PAN. If the swiped magnetic fingerprint is valid, then the server 112 can generate a dynamic authentication token in a 16 digit PAN format that is both unique and intended for one time use. In many embodiments, the dynamic authentication token does not contain the PAN associated with the magstripe card for security reasons. In this way, no sensitive information of the card holder can be obtained from the token. In several embodiments, the dynamic authentication token is generated using dynamic data from the swiped magnetic fingerprint which is stochastic in nature. Once the dynamic authentication tokens are generated, the server 112 can store the tokens or send them to the cell phone 102 for use in subsequent near field communication (NFC) type financial transactions.

In some embodiments, the tokens are sent to the cell phone 102 via a cellular network coupled to the network 110. In some embodiments, the tokens are sent to the cell phone 102 via a WiFi network coupled to the network (e.g., via a wireless router coupled to the network). In some embodiments, the tokens are sent to the cell phone 102 via a Bluetooth network provided by the laptop 108 or another computer coupled to the network.

In the embodiment illustrated in FIG. 1, a laptop computer is used. In other embodiments, other computers can be coupled to the card reader for communicating the magstripe swipe information to the server. In the embodiment illustrated in FIG. 1, a single server is shown. In other embodiments, the server can include one or more servers configured for processing financial information and information related to magstripe cards.

The network can be a public network such as the internet. In some embodiments, the network is a hybrid network containing both public networks and private networks. In other embodiments, the network is entirely a private network with connections to cellular and/or WiFi networks.

In several embodiments, a user of the cell phone can transfer the pre-authenticated swipes or tokens to others. For example, in one embodiment, the token may be transferred to another a cell phone of another user using NFC, WiFi, emails, text messages or other known means of communication between mobile devices. In some embodiments, the tokens are stored on the server (or a related website server) and accessible to the card holder from any number of computers having access via the network like the laptop. In such case, a card holder can transfer one or more tokens to another person via email, or any other suitable means of communication between mobile devices between computers. In several embodiments, this communication can be secured using various forms encryption.

Figure 2:
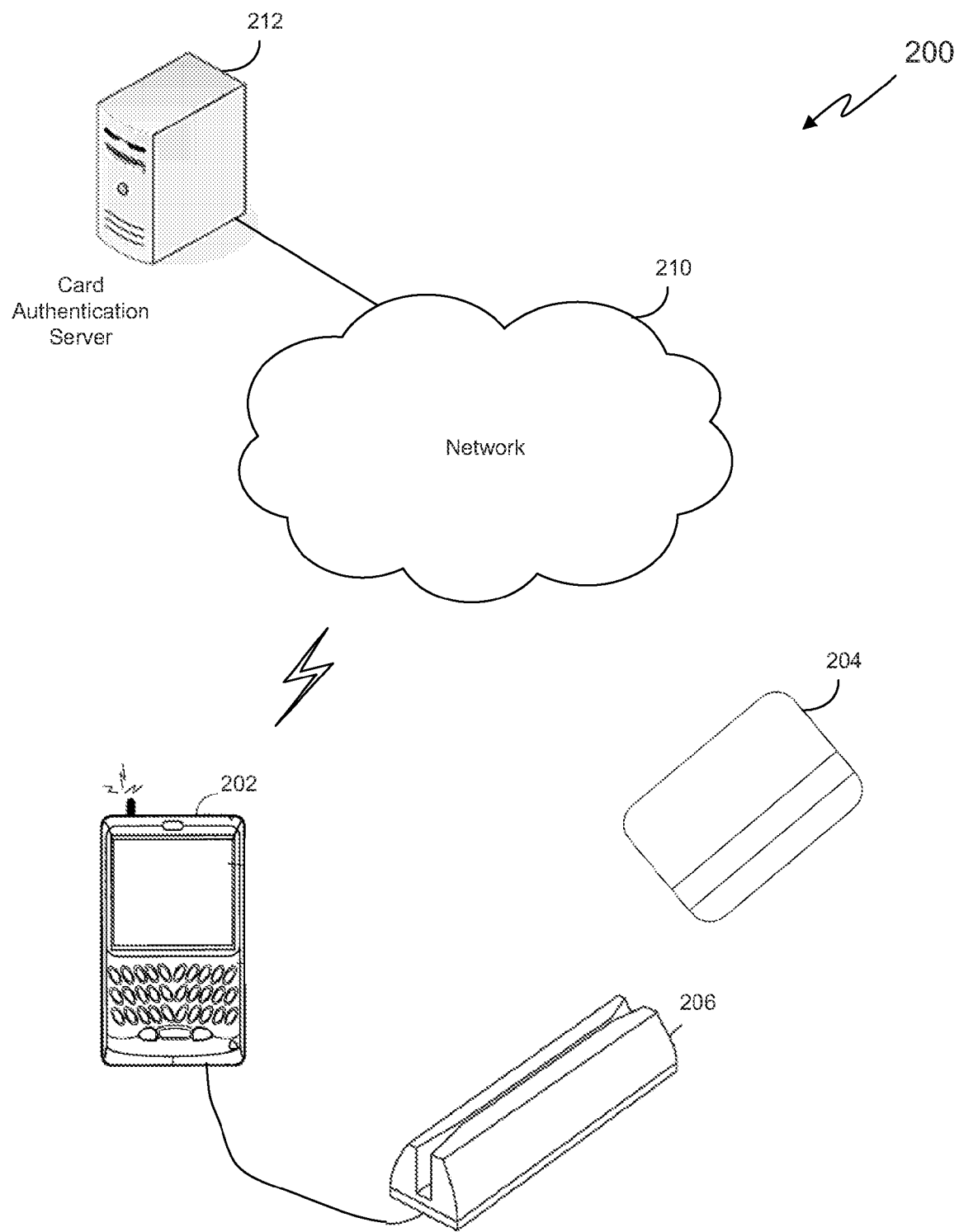
FIG. 2 is a schematic block diagram of another system for loading the dynamic authentication tokens on to a cell phone in accordance with another embodiment of the present invention.

FIG. 2 is a schematic block diagram of another system 200 for loading the dynamic authentication tokens on to a cell phone 202 in accordance with another embodiment of the present invention. The system 200 includes a card reader 206 coupled to the cell phone 202 and configured to read magstripe card 204. Cell phone 202 is in wireless communication with network 210 which is coupled to card authentication server 212. In several embodiments, the system 200 can function similar to the system 100 described above except that the cell phone 202 effectively replaces the laptop and thus performs the functions that the laptop performed in system 100. In some embodiments, the cell phone 202 can also be directly coupled to the network 210 by way of an ethernet connection or other suitable network connection.

FIG. 1 and FIG. 2 illustrate two systems or system topologies for pre-loading the authentication tokens within a mobile device. In other embodiments, other suitable means or system topologies for uploading the magstripe swipe information and for downloading the tokens to a mobile device can be used.

Figure 3:
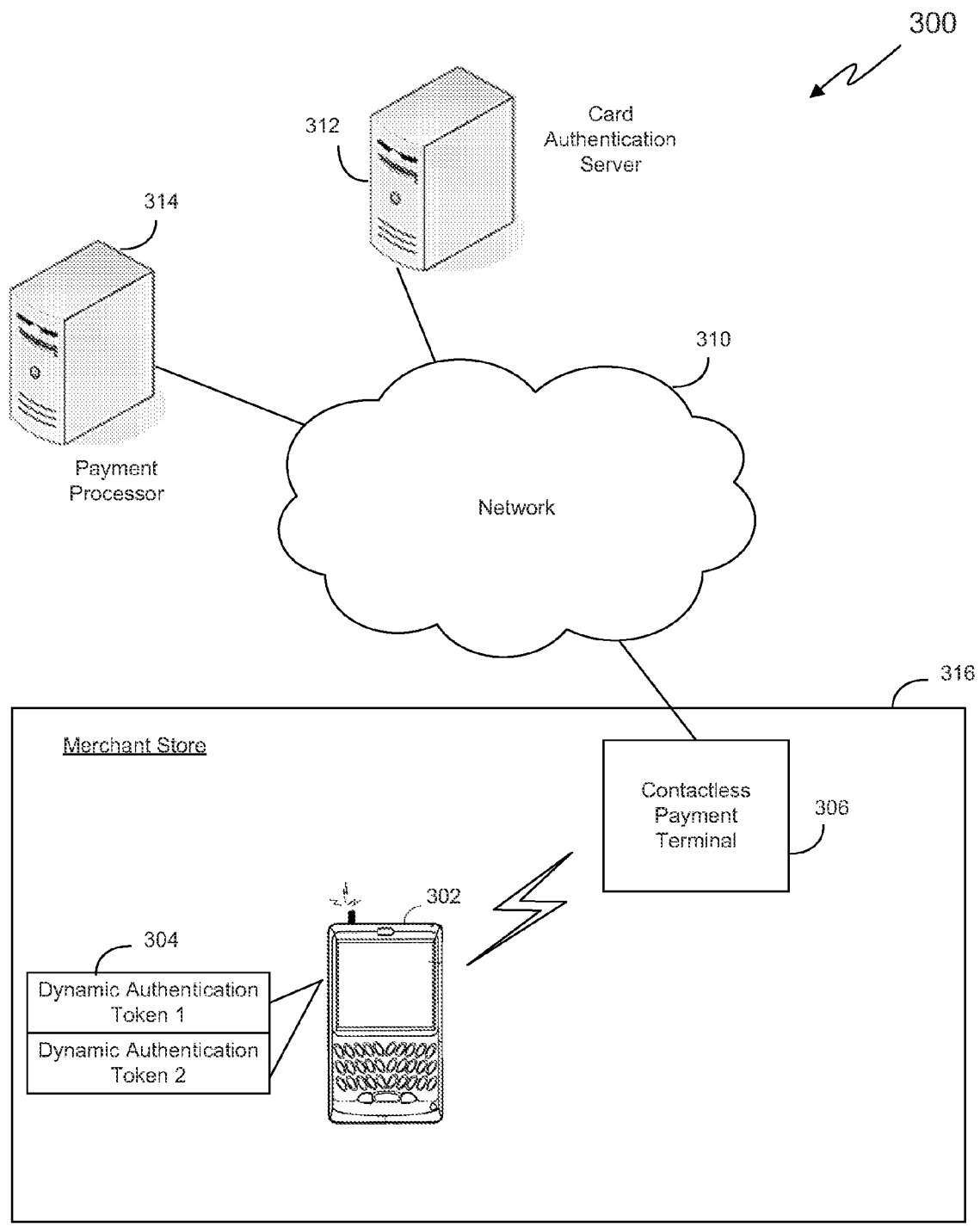
FIG. 3 is a schematic block diagram of a system for conducting a financial transaction including a cell phone configured for NFC transactions and storing one or more dynamic authentication tokens in accordance with one embodiment of the present invention.

FIG. 3 is a schematic block diagram of a system 300 for conducting a financial transaction including a cell phone 302 configured for NFC transactions and storing one or more dynamic authentication tokens 304 in accordance with one embodiment of the present invention. The system 300 also includes a contactless payment terminal 306 coupled to a card authentication server 212 via a network 310. The system 300 further includes a payment processor 314 coupled to the network 310. The contactless payment terminal 306 and cell phone 302 are location within a merchant store 316. In other embodiments, the contactless payment terminal 306 and cell phone 302 are not located within a store.

In operation, the user of the cell phone 302 can enter the merchant store 316 and position the cell phone 302 near the contactless payment terminal 306 to arrange for payment of financial transaction for a good or service provided by the merchant. The contactless payment terminal 306 can receive a dynamic authentication token 304 from the cell phone 302. The payment terminal 306 can recognize what appears to be an issuing bank or card provider, from the PAN data provided within the token 304, that is linked to the card authentication server 312. As such, the payment terminal 306 can send the dynamic authentication token 304 to the card authentication server 312 along with the details of the financial transaction (e.g., requested payment amount and time of transaction and/or similar details).

The authentication server 312 can verify that the dynamic authentication token 304 is valid. If it is valid, the authentication server 312 can securely send the PAN associated with the card holder's magstripe card along with the transaction details to the payment processor 314 for authorization of the transaction. If the transaction is authorized by the payment processor 314, the authentication server 312 can notify the contactless payment terminal 306. If the requested transaction is authorized, the contactless payment terminal 306 can allow completion of the transaction. If it is not authorized, the contactless payment terminal 306 can prevent completion of the transaction.

Figure 4:
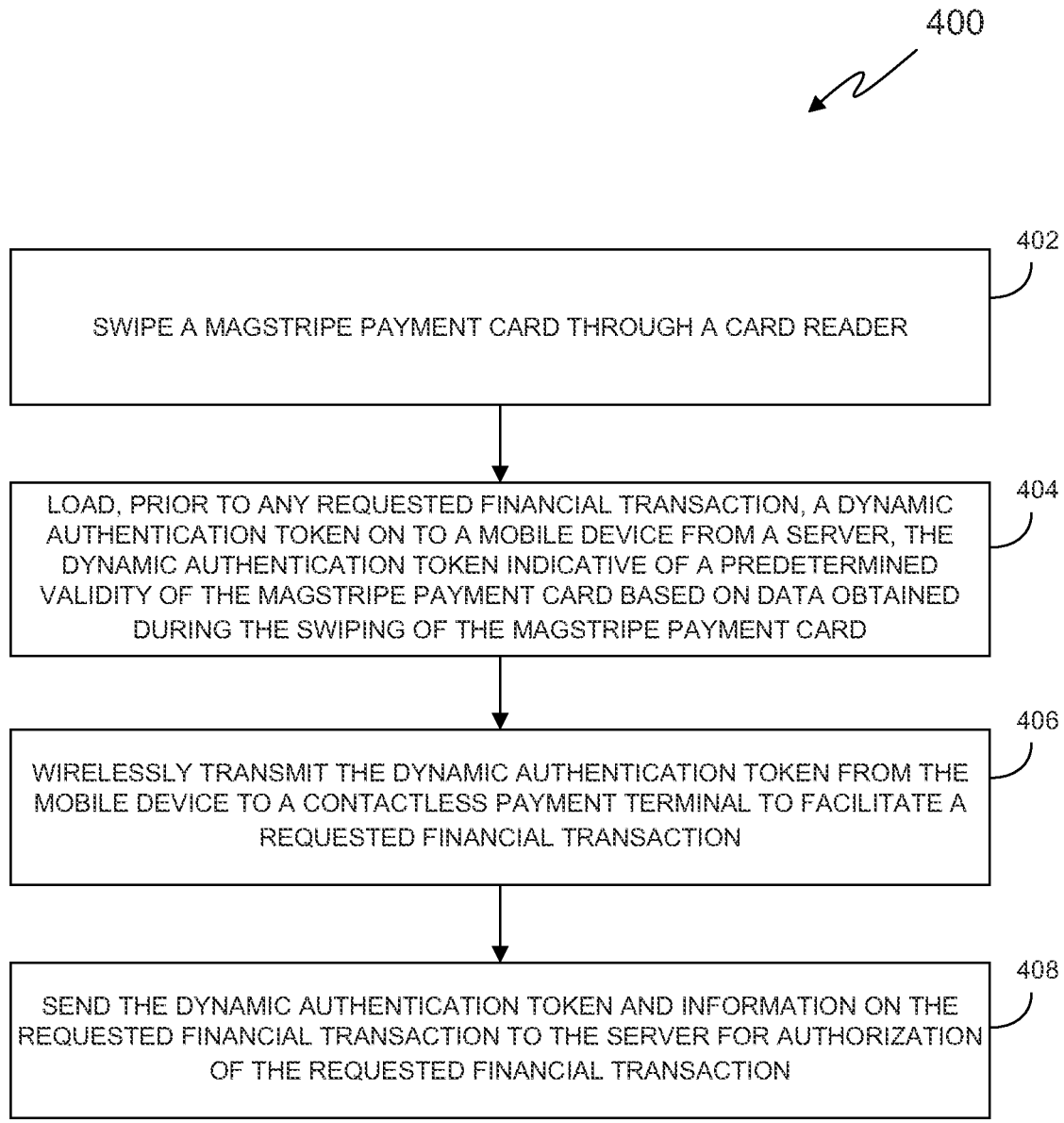
FIG. 4 is a process for conducting contactless payments using a mobile device in accordance with one embodiment of the present invention.

FIG. 4 is a process 400 for conducting contactless payments using a mobile device in accordance with one embodiment of the present invention. In particular embodiments, the process 400 can be used with the systems described above in the discussions of FIGS. 1-3. The process first swipes (402) a magstripe payment card through a card reader. In several embodiments, the card holder swipes his magstripe payment card through a card reader attached to a secure computer such as his home computer or a secure mobile device such as a cell phone. The process then loads (404), prior to any requested financial transaction, a dynamic authentication token on to a mobile device from a server, the dynamic authentication token indicative of a predetermined validity of the magstripe payment card based on data obtained during the swiping of the magstripe payment card. In several embodiments, the swiped magstripe information is sent to and validated at a trusted authentication server. In such case, the server then generates the dynamic authentication token and sends it to the mobile device.

The process then wirelessly transmits (406) the dynamic authentication token from the mobile device to a contactless payment terminal to facilitate a requested financial transaction. In many embodiments, the card holder's mobile device is brought in the vicinity of a contactless payment terminal which transmits the token in response to an instruction provided by the card holder. In some embodiments, the transaction however may be requested by a person other than the card holder who is authorized to conduct the transaction. The process then sends (408) the dynamic authentication token and information on the requested financial transaction to the server for authorization of the requested financial transaction. In several embodiments, the dynamic authentication token and information on the requested financial transaction are sent to the server by the contactless payment terminal. In many embodiments, the server then sends appropriate magstripe information and transaction information to a authorization server associated with the issuer of the magstripe card for authorization of the particular requested financial transaction. If it is authorized, the authentication server notifies the payment terminal (e.g., the merchant).

In one embodiment, the process can perform the sequence of actions in any order. In another embodiment, the process can skip one or more of the actions. In other embodiments, one of more of the actions are performed simultaneously. In some embodiments, additional actions can be performed.

Figure 5:
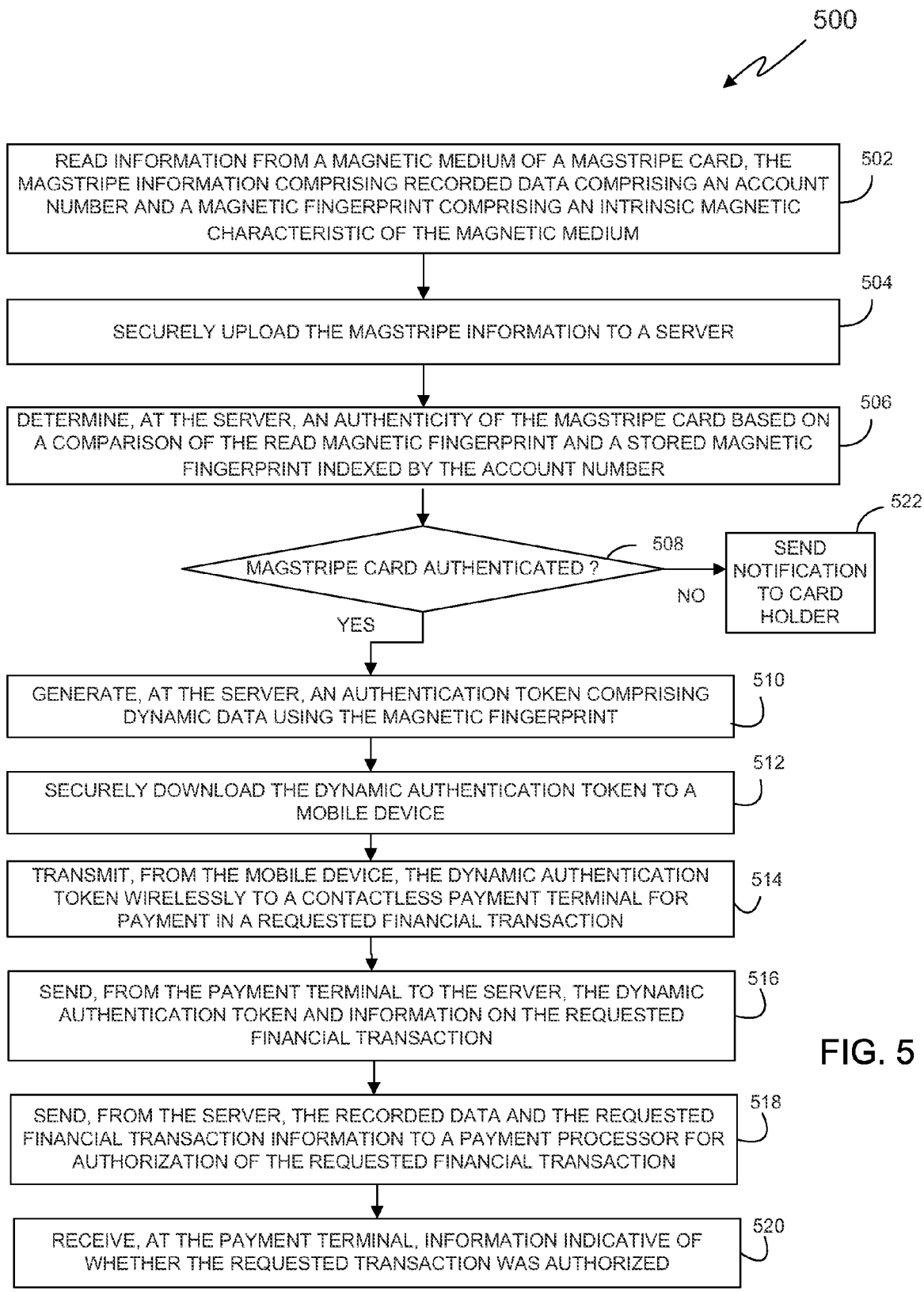
FIG. 5 is another process for conducting contactless payments using a mobile device in accordance with another embodiment of the present invention.

FIG. 5 is another process 500 for conducting contactless payments using a mobile device in accordance with another embodiment of the present invention. In particular embodiments, the process 500 can be used with the systems described above in the discussions of FIGS. 1-3. The process first reads (502) information from a magnetic medium of a magstripe card, the magstripe information comprising recorded data comprising an account number and a magnetic fingerprint comprising an intrinsic magnetic characteristic of the magnetic medium. In several embodiments, the magstripe information is read using a card reader configured to extract the magnetic fingerprint. Embodiments of such card readers are described in the patents and patent applications referenced above and incorporated herein by reference. The process then securely uploads (504) the magstripe information to a server. The process then determines (506), at the server, an authenticity of the magstripe card based on a comparison of the read magnetic fingerprint and a stored magnetic fingerprint indexed by the account number. In several embodiments, the server determines whether there is an acceptable degree of correlation between the read magnetic fingerprint and the stored magnetic fingerprint. Techniques for determining an acceptable degree of correlation between magnetic fingerprints are described in the patents and patent applications referenced above.

If the magstripe card is authenticated based on the comparison, the process generates (510), at the server, an authentication token comprising dynamic data using the magnetic fingerprint. In many embodiments, each magnetic fingerprint is stochastic in nature and therefore capable of providing dynamic data for each authentication token to make it unique or effectively unique. In several embodiments, the token is generated in a 16 digit PAN format and encrypted. In one embodiment, for example, format preservation encryption is used to encrypt the token. The process then securely downloads (512) the dynamic authentication token to a mobile device, The process then transmits (514), from the mobile device, the dynamic authentication token wirelessly to a contactless payment terminal for payment in a requested financial transaction. The process then sends (516), from the payment terminal to the server, the dynamic authentication token and information on the requested financial transaction. The process then sends (518), from the server, the recorded data from the magstripe card and the requested financial transaction information to a payment processor for authorization of the requested financial transaction. The process then receives (520), at the payment terminal, information indicative of whether the requested transaction was authorized.

If the magstripe card is not authenticated based on the comparison, the process sends (522) a notification from the server to the card holder that the magstripe was not authenticated.

In one embodiment, the process can perform the sequence of actions in any order. In another embodiment, the process can skip one or more of the actions. In other embodiments, one of more of the actions are performed simultaneously. In some embodiments, additional actions can be performed.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

In one embodiment, the dynamic authentication token does not take the form of a PAN. Instead, the dynamic token is a bar code that can be scanned at a merchant terminal. In several embodiments, the dynamic tokens cannot be used more than once and effectively have no value outside of use in conjunction with the trusted authentication server. In several embodiments, the magstripe card can be thought of as a token initiator that precipitates token generation by the trusted authentication server. In such case, once these tokens are generated and no longer have a relationship to the original PAN data outside of the trusted authentication server, the tokens can be passed safely through just about any communication channel.

In some embodiments, the dynamic authentication tokens are stored on a website server liked to the trusted authentication server. In such case, the tokens can be accessed from any number of computing devices having access to the network. In several embodiments, the network is the internet. In several embodiments, the computing device is a mobile device (e.g., cell phone) that obtains one or more tokens from the website server via the internet.

What is claimed is:

1. A method for conducting contactless payments using a mobile device, the method comprising:
receiving, at the mobile device and prior to a requested financial transaction, a dynamic authentication token from a server, the dynamic authentication token indicative of a predetermined authentication of a magstripe payment card based on data obtained during a swipe of the magstripe payment card;

wirelessly transmitting, in response to a request to facilitate a financial transaction, the dynamic authentication token from the mobile device to a contactless payment terminal; and sending the dynamic authentication token and information related to the requested financial transaction to the server for authorization of the requested financial transaction.

2. The method of claim 1, wherein the wirelessly transmitting the dynamic authentication token comprises use of a communication protocol selected from the group of protocols consisting of CDMA, GSM, Bluetooth, WiFi, and combinations thereof.

3. The method of claim 1, wherein the mobile device comprises a device selected from the group consisting of a cell phone, a smartphone, a tablet PC, PDA, portable media player, and combinations thereof.

4. The method of claim 1, wherein the dynamic authentication token does not comprise an account number associated with the magstripe payment card.

5. The method of claim 1, wherein the dynamic authentication token is configured to be transferred from the mobile device to a computing device of another user using a communication protocol selected from the group consisting of near field communication, WiFi, email, text message, and combinations thereof.

6. The method of claim 1, wherein the magstripe payment card comprises a magnetic medium comprising recorded data and a magnetic fingerprint comprising an intrinsic magnetic characteristic of the magnetic medium.

7. The method of claim 6, wherein the intrinsic magnetic characteristic of the magnetic medium comprises a remnant noise characteristic.

8. The method of claim 6, further comprising generating the dynamic authentication token using a dynamic data of the magnetic fingerprint.

9. The method of claim 8, wherein the magnetic fingerprint is stochastic.

10. The method of claim 1, wherein the dynamic authentication token is configured to be used only once.

11. The method of claim 1, further comprising:
reading information from a magnetic medium of the magstripe payment card, the magstripe information comprising recorded data comprising an account number and a magnetic fingerprint comprising an intrinsic magnetic characteristic of the magnetic medium.

12. The method of claim 11, wherein the receiving, at the mobile device and prior to the requested financial transaction, the dynamic authentication token from the server comprises:
securely uploading the magstripe information to the server;
determining, at the server, an authenticity of the magstripe card based on a comparison of the read magnetic fingerprint and a stored magnetic fingerprint indexed by the account number; and
if the magstripe card is authenticated based on the comparison:
generating, at the server, the dynamic authentication token comprising dynamic data using the magnetic fingerprint; and
securely downloading the dynamic authentication token to the mobile device.

13. The method of claim 12, wherein the sending, at the contactless payment terminal, the dynamic authentication token and the information related to the requested financial transaction to the server for authorization of the requested financial transaction comprises:
sending, from the server, the recorded data and the requested financial transaction information to a payment processor for authorization of the requested financial transaction; and
receiving, at the contactless payment terminal, information indicative of whether the requested transaction was authorized.

14. A system for conducting contactless payments using a mobile device, the system comprising:
a server;
a mobile device configured to store a dynamic authentication token indicative of a predetermined authentication of a magstripe payment card based on data obtained during a swipe of the magstripe payment card, wherein the mobile device is configured to transmit the dynamic authentication token if a financial transaction is requested; and
a contactless payment terminal configured to:
receive the dynamic authentication token; and
send the dynamic authentication token and information related to the requested financial transaction to the server for authorization of the requested financial transaction.

15. The system of claim 14, wherein the mobile device is configured to transmit the dynamic authentication token using a communication protocol selected from the group of protocols consisting of CDMA, GSM, Bluetooth, WiFi, and combinations thereof.

16. The system of claim 14, wherein the mobile device comprises a device selected from the group consisting of a cell phone, a smartphone, a tablet PC, PDA, portable media player, and combinations thereof.

17. The system of claim 14, wherein the dynamic authentication token does not comprise an account number associated with the magstripe payment card.

18. The system of claim 14, wherein the dynamic authentication token is configured to be transferred from the mobile device to a computing device of another user using a communication protocol selected from the group consisting of near field communication, WiFi, email, text message, and combinations thereof.

19. The system of claim 14, wherein the magstripe payment card comprises a magnetic medium comprising recorded data and a magnetic fingerprint comprising an intrinsic magnetic characteristic of the magnetic medium.

20. The system of claim 19, wherein the intrinsic magnetic characteristic of the magnetic medium comprises a remnant noise characteristic.

21. The system of claim 19, wherein the server is configured to generate the dynamic authentication token using a dynamic data of the magnetic fingerprint.

22. The system of claim 19, wherein the magnetic fingerprint is stochastic.

23. The system of claim 14, wherein the dynamic authentication token is configured to be used only once.

24. The system of claim 14, further comprising:
a card reader configured to read information from a magnetic medium of the magstripe payment card, the magstripe information comprising recorded data comprising an account number and a magnetic fingerprint comprising an intrinsic magnetic characteristic of the magnetic medium.

25. The system of claim 14:
wherein a computer coupled to the card reader is configured to securely upload the magstripe information to the server;
wherein the server is configured to determine an authenticity of the magstripe card based on a comparison of the read magnetic fingerprint and a stored magnetic fingerprint indexed by the account number; and
wherein, if the magstripe card is authenticated based on the comparison, the server is configured to:
  generate the dynamic authentication token comprising dynamic data using the magnetic fingerprint, and
  securely download the dynamic authentication token to the mobile device.

26. The system of claim 25, further comprising:
a payment processor;
wherein the server is configured to send the recorded data and the requested financial transaction information to the payment processor for authorization of the requested financial transaction; and
wherein the contactless payment terminal is configured to receive information indicative of whether the requested transaction was authorized from the payment processor.

\* \* \* \* \*